United States Patent [19]
Carter

[11] Patent Number: 4,745,264
[45] Date of Patent: May 17, 1988

[54] HIGH EFFICIENCY AUTOREGULATING HEATER

[75] Inventor: Philip S. Carter, Palo Alto, Calif.

[73] Assignee: Metcal, Inc., Menlo Park, Calif.

[21] Appl. No.: 666,346

[22] Filed: Oct. 30, 1984

Related U.S. Application Data

[63] Continuation-in-part of Ser. No. 586,715, Mar. 6, 1985.

[51] Int. Cl.⁴ ............................................. H05B 3/10
[52] U.S. Cl. ............................. 219/553; 219/10.75; 219/10.79; 219/229
[58] Field of Search ................ 219/10.41, 1, 10.43, 219/10.49 R, 10.51, 10.53, 10.71, 10.75, 10.77, 10.49, 10.81, 229, 300, 301, 535, 553, 233, 235; 128/1.3, 303.1, 303.13, 303.14

[56] References Cited

U.S. PATENT DOCUMENTS

| | | | |
|---|---|---|---|
| 1,931,607 | 10/1933 | Halasz | 219/10.49 |
| 1,975,436 | 10/1934 | Sorrel et al. | 219/10.49 X |
| 1,975,437 | 10/1934 | Sorrel et al. | 219/10.49 |
| 2,181,274 | 11/1939 | Jackson et al. | 219/10.49 X |
| 2,465,102 | 3/1949 | Joy | 219/10.53 |
| 2,478,857 | 8/1949 | Brown et al. | 219/10.41 |
| 2,509,713 | 5/1950 | Achard | 219/10.49 |
| 2,912,553 | 11/1959 | Tudbury | 219/10.49 |
| 3,218,384 | 11/1965 | Shaw | 174/40 |
| 4,091,813 | 5/1978 | Shaw et al. | 128/303.14 |
| 4,185,632 | 1/1980 | Shaw | 219/233 X |
| 4,256,945 | 3/1981 | Carter et al. | 219/10.75 |
| 4,456,186 | 6/1984 | Ando | 219/300 |

FOREIGN PATENT DOCUMENTS 1076772 7/1967 United Kingdom .

OTHER PUBLICATIONS

"New Method of Preventing Ice Formation on Exposed Power Conductors", Toms et al, Proc., IEE, vol. 112, No. 11, Nov. 1965, p. 2,125.

*Primary Examiner*—C. L. Albritton
*Attorney, Agent, or Firm*—Hall, Myers & Rose

[57] ABSTRACT

The impedance of an autoregulating heater is greatly increased by employing in one embodiment a return conductor in the form of a helix surrounded by and insulated from a magnetic conductor; the two conductors connected in series or as a transformer across an a.c. source whereby the current in the magnetic material is forced to follow a helical path. In a preferred embodiment, a multilayered coil is wrapped about and insulated from a magnetic sleeve disposed about a copper rod; the sleeve and rod forming the secondary of a transformer. The helical path of the current in the secondary plus the impedance transformation effect of the transformer greatly enhances the impedance of the load as presented to a current source. The winding is enclosed within another magnetic sleeve which provides another magnetic shield about the heater and if connected at one end to the inner magnetic layer increases the width to thickness ratio for purposes to be described.

39 Claims, 2 Drawing Sheets

HIGH EFFICIENCY AUTOREGULATING HEATER

RELATED APPLICATIONS

This application is a continuation-in-part application of patent application Ser. No. 586,715, filed Mar. 6, 1985.

BACKGROUND OF THE INVENTION

The present invention relates to autoregulating electric heaters and more particularly, to an electromagnetic autoregulating electric soldering iron having substantially constant temperature regulation and high efficiency at quite reasonable prices.

In U.S. Pat. No. 4,256,945 of Carter and Krumme, there is described an autoregulating electric heater having a laminated structure; one lamina of which has high magnetic permeability and high resistance and has a low resistance (such as copper) in electrical contact, and therefore, thermal contact with the first lamina. This structure is adapted to be connected across a constant current, a.c., source such that the layers are in a sense in parallel across the source.

Due to skin effect, the current is initially confined to the high magnetic permeability, high resistance layer so that $P = KR_1$ where P is Power, K is $I^2$ which is a constant, and R is the effective resistance of the permeable material at high current concentrations. The dissipation of power heats the layer until it approaches its Curie temperature. The permeability of the lamina decreases towards the level of the second layer, copper for instance, at about its Curie temperature. The current is no longer confined to the high resistivity first lamina by the magnetic properties of the first lamina, and spreads into the copper layer; the resistance to the current drops materially, the power consumed, $P = KR_2$ where $R_2 << R_1$, is greatly reduced and the heating effect is reduced to a level that maintains the device at or near the Curie temperature. The device thus thermally autoregulates over a narrow temperature range about the Curie temperature.

The current source employed in the aforesaid patent is typically a high frequency source, to insure that the current is confined to the thin, high resistivity, magnetic layer until the Curie temperature of the magnetic material is attained. Specifically, the maximum regulation is achieved when the thickness of the magnetic layer is of the order of one skin depth at the frequency of operation. Under these circumstances, the maximum change in effective resistance of the structure is achieved at or about the Curie temperature. This fact can be demonstrated by reference to the equation for skin depth in a monolithic, i.e., non-laminar magnetic structure:

$$S.D. = 5030 \sqrt{\frac{\rho}{\mu f}} \text{ cm,}$$

where is the resistivity of the material in ohm-cms, is magnetic permeability mu and is frequency of the current. The field falls off in accordance with $e^{-x}$ where x is thickness/skin depth. Accordingly, in a monolithic structure, by calculation, 63.2% of the current is confined to one skin depth in the high mu material. In the region of the Curie temperature, where $\mu = 1$, the current spreads into a region $$S.D. = 5030 \sqrt{\frac{\rho}{\mu f}} \text{ cm.}$$

If mu was originally equal to 200 (200−5000 being possible), the skin depth in the region at the Curie temperature increases by the square root of 200; i.e., the skin depth in the monolithic structure is now 14.14 times greater than with $\mu = 200$.

The same type of reasoning concerning the skin effect may be applied to the two layer laminar structure in the aforesaid patent. Below the Curie temperature, the majority of the current flows in the magnetic layer when the thickness of this layer is nominally one skin depth of the material below the Curie temperature. In the region of the Curie temperature, the majority of the current now flows in the copper and the resistance drops dramatically. If the thickness of this high mu material were greater that two skin depths, the percentage change of current flowing in the high conductivity copper would be less and the resistivity change would not be as dramatic. Similarly, if the thickness of the high mu material were materially less than one skin depth, the percentage of current flowing in the high resistivity material at a temperature less than the Curie temperature would be less so that the change of resistance at the Curie temperature would again not be as dramatic. The region of 0.5 to 1.8 skin depth is preferred.

An exact relationship for the two layer case is quite complex. The basic mathematical formulas for surface impedance from which expressions can be obtained for the ratio of the maximum resistance, $R_{max}$, below the Curie temperature, to the minimum resistance, $R_{min}$, above the Curie temperature, are given in Section 5.19, pp. 298–303 of the standard reference, "Fields and Waves in Communications Electronics," 3rd Edition, by S. Ramo, J. R. Winnery, and T. VanDuzer, published by John Wiley and Sons, New York, 1965. Although the theory described in the above reference is precise only for the case of flat layers, it is still accurate enough for all practical applications in which the skin depth is substantially less than the radius of curvature.

Difficulty may arise in such devices when the Curie temperature is achieved due to spread of the current and/or magnetic flux into adjacent regions outside of the device, particularly if the device is located close to sensitive electrical components.

In copending patent application of Carter and Krumme, Ser. No. 243,777, filed Mar. 16, 1981, now U.S. Pat. No. 4,701,587 issued Oct. 20, 1987, a continuation-in-part application of the application from which the aforesaid patent matured, there is described a mechanism for preventing the high frequency field generated in the heated device from radiating into the regions adjacent the device. This effect is accomplished by insuring that the copper or other material of high conductivity is sufficiently thick, several skin depths at the frequency of the source, to prevent such radiation and electrical field activity. This feature is important in many applications of the device such as a soldering iron where electromagnetic fields may induce relatively large currents in sensitive circuit components which may destroy such components.

In accordance with the invention of co-pending application of John F. Krumme, Ser. No. 430,317, entitled "Autoregulating Electrically Shielded Heater," filed on Sept. 30, 1982, now abandoned, a continuation-in-part application having been filed and now issued as U.S. Pat. No. 4,695,713, issued Sept. 22, 1987, a relatively low frequency constant current source may be employed as a result of fabricating the normally non-magnetic, low resistivity layer from a high permeability, high Curie temperature material. Thus, the device comprises a high permeability, high resistivity first layer adjacent the current return path and a high permeability, preferably low resistivity second layer remote from the return path; the second layer having a higher Curie temperature than the first-mentioned layer.

The theory of operation underlying the invention of the aforesaid application filed on Sept. 30, 1982, now U.S. Pat. No. 4,695,713, is that by using a high permeability, high Curie temperature material as the low resistivity layer, the skin depth of the current in this second layer is such as to confine the current to a quite thin layer even at low frequencies thereby essentially insulating the outer surfaces electrically and magnetically but not thermally with a low resistivity layer of manageable thickness. The second layer is preferably formed of a low resistivity material, but this is not essential.

The power regulation ratios ($\Delta R$) in such a device; 2:1 to 4:1, are not as high as with the device of the patent with a resistivity difference of about 10:1, but the $\Delta R$ difference may be reduced by using materials of higher and lower resistivities for the lower Curie temperature and high Curie temperature materials, respectively. Also, a high mu, relatively low resistivity material such as iron or low carbon steel may be employed to further increase the power regulation ratio.

In accordance with the invention of co-pending patent application Ser. No. 445,862 of John F. Krumme filed on Dec. 1, 1982, autoregulating power ratios of 6:1 to 7:1 are attained while retaining the ability to utilize low frequency supplies without producing unacceptable levels of field radiation.

The objects of the invention are achieved by providing a region of high conductivity at the interface of the two members having high permeability as set forth in the Krumme application, Ser. No. 430,317, filed on Sept. 30, 1982 now U.S. Pat. No. 4,695,713.

The material in the interface region may be copper, for instance, or other highly conductive material. The material may appear as a separate layer, a sandwich of magnetic, non-magnetic and magnetic material or may be bonded to the high and/or low Curie temperature, ferromagnetic layers at the interface to provide a low resistivity, interface region.

With autoregulating ratios of 6:1 and 7:1, the heating variations below and above Curie temperature are quite large so that the apparatus may respond rapidly to thermal load variations and thus maintain accurate temperature regulation in a small device operating at low frequency.

The disclosure of the above cited applications are incorporated herein by reference, all being assigned to the same assignee as the present invention.

A difficulty is encountered when any of the above heaters are employed in soldering irons such as illustrated in FIG. 4 of the aforesaid patent. The impedance of the soldering iron, due to its relatively small size, is quite low (of the order of 0.1 to 0.25 ohm) and in consequence, presents a poor impedance match to the source. This problem is mitigated to some extent by including impedance matching circuits in the handle of the soldering iron. In such a case; however, a greater resistance appears in the handle than at the tip of the iron, making the handle quite hot and the overall soldering iron performance quite inefficient; i.e., more energy is dissipated in the handle than in the iron.

SUMMARY OF THE INVENTION

It is an object of the present invention to provide an autoregulating soldering iron having a heater with a relatively high impedance.

It is another object of the present invention to provide an autoregulating soldering iron having high efficiency.

Still another object of the present invention is to provide an autoregulating soldering iron having a relatively high impedance and an impedance matching circuit; the combination of which produces a highly efficient soldering iron.

In its broadest aspect, the invention contemplates a temperature autoregulating device in which a helical conductor in the form of a flat helical single conductor or a multiturn conductor which may be layered, are included in the drive circuit for the heater. In a first embodiment, the return conductor of the heater is in the form of a helix, is axially surrounded by and insulated from a conductive body of high mu material with one end or both ends of each connected together and a source of constant current, as hereinafter defined, is connected across the other end of the conductors.

The high mu material may be the sole outer conductor or may be of the type disclosed in the aforesaid patent or any one of the aforesaid patent applications. More specifically, the tip of a soldering iron has a hollow cylindrical outer laminated member, terminating in the tip of the iron, and a cylindrical inner member. The inner member is ceramic or other heat insensitive material having a helical conductor formed on its outer surface. The outer member has a high mu material inner cylinder and a low resistance conductor, such as copper, disposed about and in contact with the high mu material. The cylindrical conductor and high mu material are insulated from one another except that the end of the helical conductor and the outer laminated member are connected together electrically at the tip of the iron. A source of constant current, as hereinafter defined, is connected across the conductor of the inner and outer members remote from the iron's tip.

The insulation between the helical conductor and the high mu material is quite thin so that unity coupling of flux between the helix and the mu material is almost realized. In consequence, the current flowing in the latter material is confined to a helical path greatly increasing the length of the path of the current through the high resistance material and increasing the effective resistance thereof. Another factor increasing resistance of the device is the transformer coupling between the helix and the high mu material, whereby impedance of the secondary circuit (outer conductor) is reflected back into the primary circuit as the square of the turns ratio, i.e., $$R_p = \left(\frac{N_p}{N_s}\right)^2 R_s;$$

where the subscripts stand for primary and secondary, and the secondary has only a single turn. Impedances as high as 6 ohms have been developed at the input of the heater element by this method; an increase over non-helical couplings of 15 to 60 times.

It is noted that in the above description, transformer action is described although the primary and secondary are electrically in series across the source. The action in such a case is comparable to that of an autotransformer whereas the device may be built as a transformer having totally separate windings.

In a preferred embodiment of the soldering iron of the present invention, the tip of the soldering iron has a rearward, preferably cylindrical, extension having magnetic material, a magnetic sleeve, clad thereon. The magnetic sleeve is surrounded by an insulating layer which has a coil of one or more layers wound thereon. The coil is surrounded by a second magnetic sleeve to magnetically shield the coil from the surrounding regions.

The coil and the inner magnetic sleeve are preferably not connected together so that the coil serves as the primary winding of a transformer and the inner magnetic sleeve serves as a secondary winding together with the adjacent copper cylinder.

The resistance reflected into the primary winding (coil) is increased again by the turns ratio of the transformer and by the increase in the resistance of the secondary winding as a result of the helical path followed by the current in that winding. The increase in number of turns of the primary winding in the preferred embodiment permits excellent impedance matching of the to the source.

Efficiencies in autoregulating systems of the type with which the present invention is concerned vary with temperatures above and below the autoregulating temperature. For maximum efficiency, the impedance that the iron presents to the end of the cable should be 50+jo ohms for a 50 ohm cable, whereby little of the energy delivered to the load below Curie temperature is reflected. In order to achieve an approach to such a requirement, in the prior devices, impedances in the form of RLC networks were placed in the handle of the iron. The problem with such approach was that with very low impedance in the heating element, large impedances had to be placed in the handle and more heat was dissipated in the handle than in the heating element; a near impossible situation.

In accordance with the present invention, the increase in heater resistance as indicated above, greatly mitigates the prior art problem.

In a further feature of the invention employed in the first embodiment of the heater, an impedance matching circuit in the handle of the iron is greatly simplified and dissipates relatively little energy. One such circuit is a parallel resonant circuit constituting an inductance connected in series with the heater and a capacitor connected in parallel with the inductance and heater series circuit. The inductance is, in one embodiment, an iron dust inductor; such an inductor providing high inductances in a small size and with very low iron losses; i.e., eddy current losses. With such a device, efficiencies of 96-97% are achievable below autoregulating temperatures. Above the autoregulating (Curie) temperature, the efficiency falls to about 80%, at worst. In a recent engineering model, the impedances below and above Curie temperature were 60.4+j5.8 and 44.7−j90.9, respectively, with VSWRs of 1.24 and 5.5, respectively. Thus, the loaded VSWR was about 1.24; the VSWR when the maximum energy is being delivered.

In the preferred embodiment of this invention, the impedance matching network is still further simplified. The resistance is brought up to 50 ohms by the transformer action and all that is required is a series capacitor to buck out the impedance of the circuit.

In a modification of the preferred embodiment the inner and outer magnetic sleeves are bridged at one end by a magnetic layer deposited on the back of the tip of the irons and may also be bridged at the other ends by an end cap for reasons to be described subsequently.

In its broadest sense the present invention contemplates a heater having a helical conductor for inducing in a generally coaxial body of magnetic material, a helical current path whereby to increase the resistance of the path; which resistance is further enhanced by the transformer action of the circuit to provide at least a reasonably good impedance match to the power supply of the system.

Although throughout the description reference is made to a soldering iron or iron, it is to be understood that the present invention is applicable to any type of heater of the type to which the present invention relates and which otherwise would have a very low resistance.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DETAILED DESCRIPTION OF THE DRAWINGS

Figure 1:
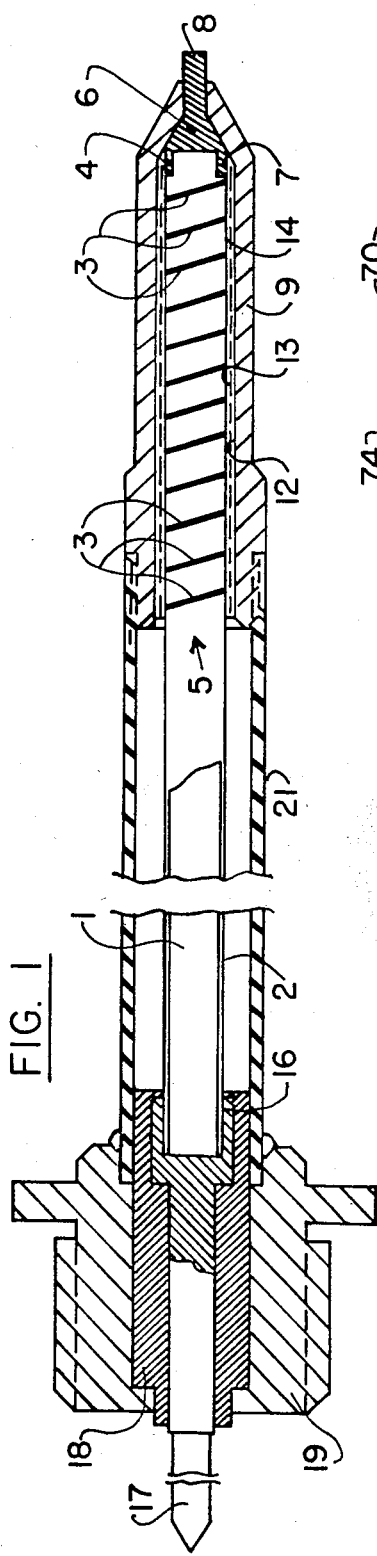
FIG. 1 is a view in cross-section of a first embodiment of the heater of the present invention.

Referring now specifically to FIG. 1 of the accompanying drawings, there is illustrated one embodiment of the present invention.

A ceramic or the like rod 1 is coated with a thin coating 2 of copper or like material. The coating 2 is etched or otherwise removed to provide a helix 5 of copper composed of multiple turns 3. The ceramic rod is provided with a region 4 of reduced diameter at its right end as viewed in FIG. 1 to accept a conductive end cap 6 comprising a hollow cylindrical portion 7 that extends over the region 4 of the rod 1 and terminate at its right end in a solid conductive rod 8.

The rod 1 is surrounded by a hollow conductive cylinder 9 having a tapered (conical) right end forming the tip 11 of the soldering iron. The rod 8 of the end cap 6 extends through the tip 11 of the iron and is suitably secured thereto as by high temperature brazing, as an example.

The hollow cylinder 9 has an inner cylindrical wall 12 lined with a high mu material 13 such as Alloy 42. A thin layer 14 of high temperature insulation, such as Kapton, is disposed between the helix 5 and the material 13.

Completing the description of the structure of this embodiment of the invention, the rod 1, at its left end is enclosed with a contact 16 that terminates in a male coax terminal 17. The contact 16 is surrounded by an insulator 18 which in turn is surrounded by outer electrical terminal 19. A hollow conductive sleeve 21 is threaded at its right end to the left end, all as viewed in FIG. 1, to the cylinder 9 and at its left end, lies between and in contact with insulator 18 and outer terminal 19. Thus, the electrical circuit extends from contact 17 through copper layer 2, turns 3 of the helix 5, end cap 6, sleeve 12 and high mu material 13 of cylinder 9, and sleeve 21 to outer terminal 19.

In operation, voltage is applied across terminals 17 and 19 to cause current to flow in the circuit. The magnetic field established by the current flowing through the helix 5 constrains the current flowing in the high mu material 13 to follow a helical path greatly increasing the length of the current path through the material 13.

In order to enhance the effect of the magnetic field on current flow in the elements 13 and 9, an attempt is made to approach unity coupling between the turns 3 and the high mu sleeve 13. The coupling is enhanced by establishing the ratio of the width of each turn 3 to the spacing between the turns 3 and the high mu material 13 at, at least, and preferably greater than 4.

With a coupling approaching unity, the transformer equation for impedance reflected from the secondary into the primary winding is essentialy valid. Thus, if 10 turns 3 of the helix are provided while the mu material 13 constitutes a single turn, the impedance of the mu metal is enhanced a hundredfold in the circuit.

The spacing between the turns of the helix should be such as to define a capacitance between turns that determines a resonant frequency of the heater well above the frequency of the source which latter frequency may be as high as 20 MHz or higher.

Figure 2:
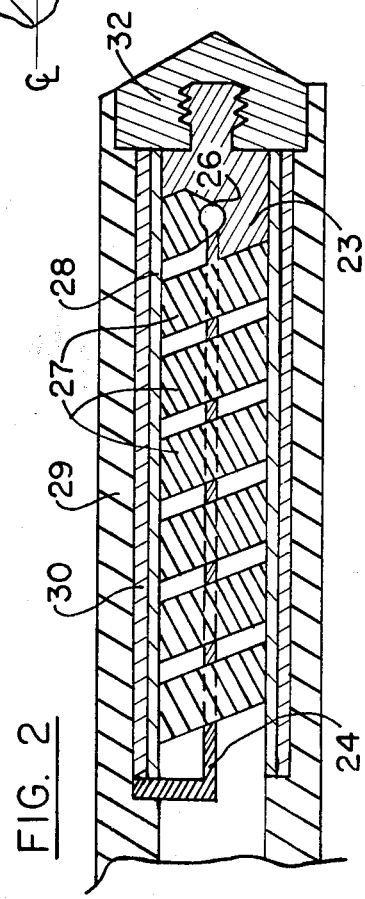
FIG. 2 is a view in cross-section of a second embodiment of the heater of the present invention.

Referring to FIG. 2 of the accompanying drawings, there is illustrated an embodiment of the invention employing a transformer having separated primary and secondary windings. In such an arrangement, the only basic modification of the apparatus of FIG. 1 is in the heater area. Ceramic rod 23 is center drilled to accept a conductive rod 24 that connects at 26 to helix 27. The helix 27 is enclosed within a thin insulating sleeve 28 which itself is enclosed within a hollow cylinder 29. The hollow cylinder 29 has an inner cylindrical wall 30 composed of high mu material such as Alloy 42. The outer portion of cylinder 29 is a highly conductive material such as copper. The cylinder 29 has an end cap 32 that threads into the rod 23, in the process contacting the end of the cylinder 29. The left end of the conductive rod 24 is connected by means of a radial hole in the ceramic rod, to the cylinder 29.

As previously indicated, the transformer action of the embodiments of FIGS. 1 and 2 coupled with the elongated path induced in the high mu material greatly increases the impedance of the heater; raising it to 3 to 6 ohms. In order to match the load to the 50 ohms of the source, an impedance matching circuit is employed and is usually located in the handle of the iron.

Figure 3:
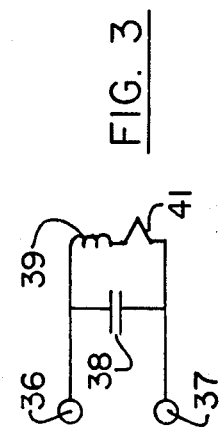
FIG. 3 is a circuit diagram of a first embodiment of a heater and impedance matching circuit of the present invention.

In this aspect of the present invention, impedance matching is achieved by the use of a parallel resonant circuit as illustrated in FIG. 3 of the accompanying drawings. Terminals 36 and 37 are connected via a coax cable, for instance, to the energy source of the system, a constant current source. Typically, the characteristic impedances of the cable and the source are 50 ohms. In one form of the present invention, the source operates at 13.5 MHz. Capacitor 38 is connected across terminals 36 and 37 and an inductor 39 is connected in series with the heater 41 of the iron across the capacitor 38.

The capacitor 38, the inductor 39, and the heater 41, provide a parallel resonant or tank circuit of low Q. It is known that to a good approximation $R_3 = Q^2 R_a$ at the unity power factor frequency, where $R_e$ is the effective resistance appearing across terminals 36 and 37, Q is the Q of the circuit at its resonant frequency and $R_a$ is the actual resistance of the heater 41, plus the resistance of the tuning inductor 39, approximately 2 to 6 ohms in the present case. Applying the above formula to a case where the heater resistance is 4.7 ohms and the inductor resistance is 0.3 ohms, we have $R_a$ equal to 5 ohms, and $$50 = Q^2 \times 5$$
$$Q = \sqrt{10}.$$

It is readily evident that the increase in resistance of the tip has greatly decreased the Q required in the impedance matching circuit and also greatly reduced the current in the impedance matching circuit and the heater. Thus, a far greater proportion of the energy is dissipated in the heater 41 that in the elements 38 and 39 as would be the case with an iron of materially less resistance.

The inductance 39 may be realized by the use of an iron dust inductor. Such a device is filled with iron dust in which each particle is coated with insulation whereby eddy current losses are minimized. Such an inductor, for purposes of the present invention, preferably takes the form of a cylinder with an axial hole through which extends one of the wires to the iron. Thus, the inductor is quite small, may readily fit in the handle of the iron and produces little heat. A ¾ inch diameter handle may readily accept the capacitor 38 and inductor 39.

As previously indicated, the impedance of one embodiment of FIG. 3 of the accompanying drawings was 60.4+j5.8 ohms and had a VSWR of 1.24 both thermally loaded and unloaded below the Curie temperature. When autoregulating, i.e., above Curie temperature, the impedance both loaded and unloaded became 44.7+j90.9 with a VSWR of 5.5. These latter figures are acceptable particularly since they only occur during the low energy condition of the system; i.e., when I²R losses are at their lowest. Efficiencies for the two conditions are roughly 96–97% and 80%, at worst, respectively.

Figure 4:
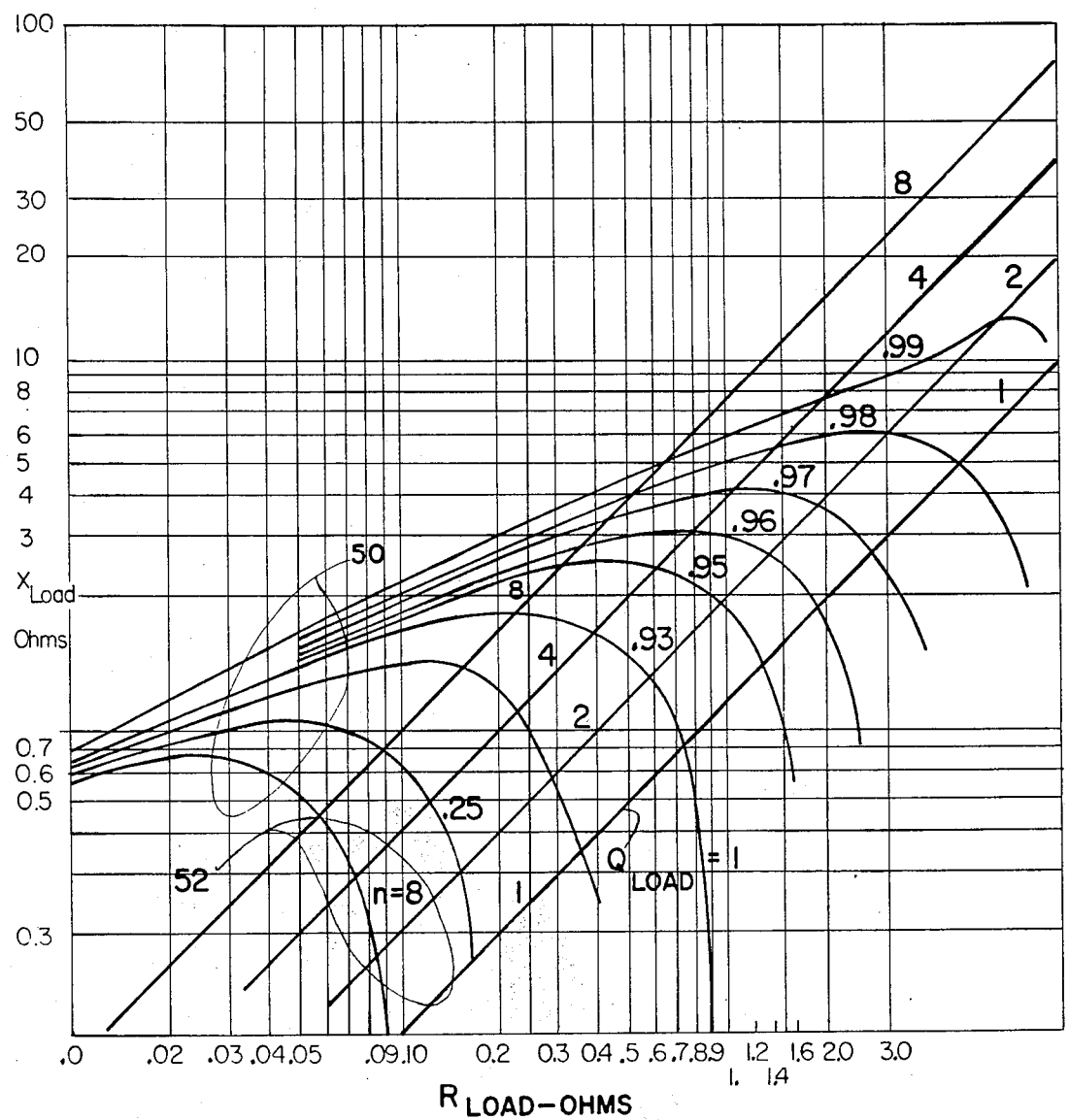
FIG. 4 is a plot of the efficiency of the soldering iron of the present invention as a function of various circuit impedances.

Reference is now made to FIG. 4 of the accompanying drawings which is a graph primarily of the performance of the embodiment of FIG. 3 of the accompanying drawings. In this graph, $X_{Load}$ is the inductive reactance of the heater 41, $R_{Load}$ is the resistance of the heater 41, $X_T$ is the inductive reactance of the inductor 39, $R_T$ is resistance of inductor 39, the coil Q is 100; $Q_{Load}$ is $X_{Load}/R_{Load}$ and efficiency, $\eta$, is $R_{Load}/(R_{Load}+R_T)$.

Referring again to FIG. 4, the efficiencies are plotted by the group of curves 50 and the $Q_{Load}$s are plotted by curves 52. Before discussing the details of the graph, it should be noted that the Q's of the load prior to the improvements illustrated in FIG. 1 were about 6. The present invention, due to the increase in effective resistance decreases the Q of the load to about 2-3.

The graph illustrates the fact that with a load resistance of 0.1 ohms (a prior attempt at fabricating an iron) the maximum efficiency achievable was about 84% and at 0.25 ohms was about 91.5%. With the soldering iron of the present invention, heater plus matching circuit, the efficiencies achievable at 3 to 6 ohms are about 98%.

Figure 5:
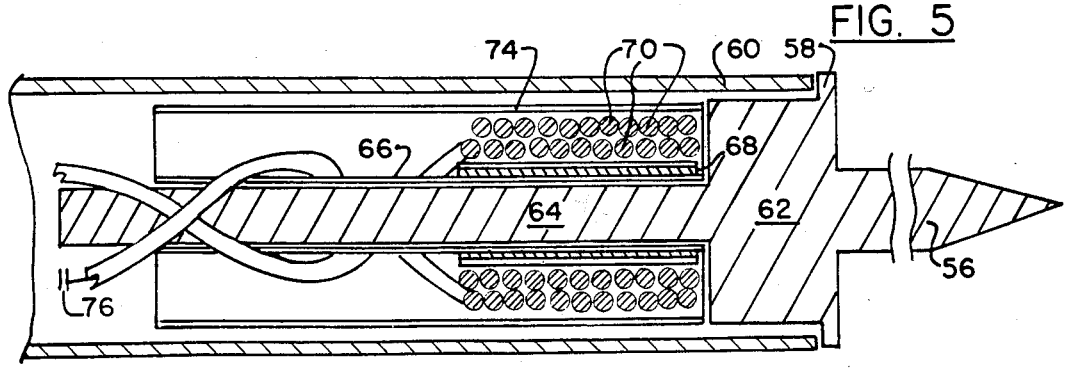
FIG. 5 is a cross-sectional view of the preferred embodiment of the present invention.

Referring now specifically to FIG. 5 of the accompanying drawings there is illustrated a preferred embodiment of the present invention. Again the heater is illustrated in a soldering iron environment but the principles of operation are applicable to heaters in general.

The soldering iron has a tip 56 having a shoulder 58 seated against an outer preferably non-magnetic stainless steel sleeve 60. The shoulder 58 has an extension 62 seated within the sleeve 60, the extension 62 having a cylindrical rod 64 extending in a direction opposite from the tip 56.

Deposited on or otherwise disposed about the rod 64 is a thin layer 66 of magnetic material such as Alloy 42. A layer 68 of Kapton type or the like may be wrapped about layer 66 and a coil 70, is wrapped about the tape 68 and layer 66. Alternatively, the wires of the coil 70 may be coated with high temperature insulation and directly applied to the layer 66 adjacent the extension 62. A further magnetic sleeve 74 is disposed about the coil 70 and appropriately secured in place.

The coil 70 is preferably formed of relatively thin flat rectangular wire in multiple layers which serves basically the same functin as the helical conductor 3 of FIG. 1 in that as a transformer it raises the impedance of the secondary reflected in the primary circuit and directly increases the impedance of the secondary circuit by defining a helical current path in the secondary winding, i.e. layer 66.

The device operates as an autoregulating heater in that upon the magnetic layer being raised to a point where it approaches its Curie temperature, it becomes virtually non-magnetic and the secondary current reduces and also spreads into the rod 64 which may be copper or a like material. Heating is reduced, temperature falls and the permeability of layer 66 is reestablished.

The sleeve 74 is employed to isolate the coil 70 from the sleeve 60. The sleeve 60 is a relatively good conductor and would serve to at least partially short circuit the secondary of the transformer if not isolated from coil 70 by the sleeve 74 of magnetic material. The stainless steel sleeve 60 serves to isolate the outside world from any residual high frequency fields that might otherwise be radiated from the structure.

The magnetic layer 74 preferably remains magnetic at all times and may, if necessary, have a higher Curie temperature than sleeve 66 if insufficient cooling is available.

As a result of the greatly increased resistance of the secondary as reflected into the primary circuit, a simple solution to the matching problems discussed above, is available. The resistances can be readily made to achieve 50 ohms as seen in the primary circuit below Curie temperature. Thus all that is necessary to achieve matching is a series capacitor, such as capacitor 76 in FIG. 5 utilized to match the inductance primarily of the coil 70.

Figure 6:
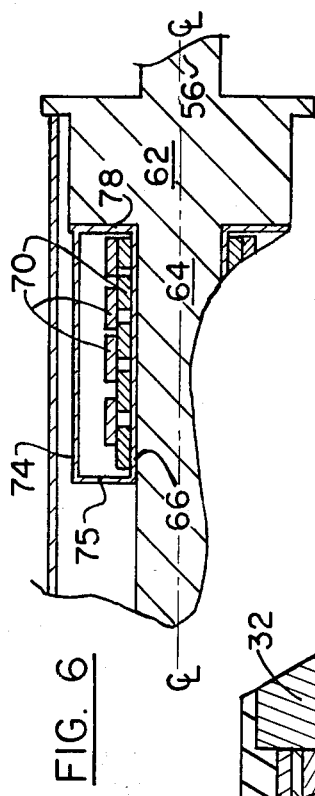
FIG. 6 is a cross-sectional view of a modification of the embodiment of FIG. 5 hereof.

Referring now to FIG. 6 of the accompanying drawings, the same reference numerals are employed as in FIG. 5. In this modification of the structure of FIG. 5, a further magnetic layer 78 is deposited on the surface of the extension 62 from which the rod 64 extends. This layer is employed to make the layers 66 and 74 continuous between their ends adjacent from the extension 62. An end cap 75 of magnetic material or other metal with a magnetic coating, bridges the layers 66 and 74 at their ends nearest to the extension 62. The advantage of this construction relates to the fact that the intrinsic permeability of a material may not be realized in all structures. Specifically, if the magnetic layer is completely closed then the intrinsic permeability of the magnetic material may be realized. If, however, the magnetic layer has exposed edges as in the present application then the intrinsic permeability cannot be realized. The equation for the relationship between intrinsic and effective permeability for a rectangle is extremely complex but can be approximated by the following equation for an ovoid.

$$\mu_E = \mu_I \frac{1}{1 + \mu_I \left( \frac{t}{w + t} \right)}$$

where $\mu_E$ is effective permeability, $\mu_I$ is intrinsic permeability, t is thickness and w is width. The table below illustrates the effect of both permeability and the w/t ratio on the effective permeability.

| | $\mu_I$ | |
|---|---|---|
| w/t | 200 | 400 |
| 10 | 10 | 10 |
| 25 | 23 | 24 |
| 50 | 41 | 44 |
| 100 | 67 | 80 |
| 200 | 100 | 133 |
| 300 | 120 | 171 |
| 400 | 133 | 200 |
| 500 | 143 | 227 |
| 1000 | 167 | 286 |

Thus it is seen that the greater the ratio the higher the effective permeability and the lower the permeability the higher the ratio $\mu_E/\mu_I$. For instance, the ratio $\mu_E/\mu_I$ for w/t equal to 1000 is 0.835 for a permeability of 200 but is only 0.715 for a permeability of 400.

In the present case, with a thickness of the magnetic layer of 0.0003 inch and a length of the inner layer 66 of approximately ½ inches, the ratio is 1660 to 1 and the effective permeability of the Alloy 42 is 178.6 If, however, the sleeves 66 and 74 are bridged by end caps of several skin depths thickness on both ends, the effective permeability is equal to the intrinsic permeability.

The term "constant current" as employed herein does not mean a current that cannot increase, but means a heater current magnitude that obeys the following formula:

$$\frac{\Delta I}{I} = \frac{1}{2} \frac{\Delta R}{R}$$

Specifically, in order to autoregulate, the power delivered to the load 12 and 13 or 29 and 30 when the heater exceeds Curie temperature, must be less than the power delivered to the load 12 and 13 or 29 and 30 below Curie temperature. If the current is held invariable, then the best autoregulating ratio is achieved short of controlling the power supply to reduce current. So long, however, that the current is controlled in accordance with the above formula, autoregulation is achieved. Thus, when large autoregulating ratios are not required, constraints on the degree of current control may be relaxed thus reducing the cost of the power supply.

The above equation is derived by analyzing the equation:

$$P = I^2 R,$$

where P is power. Differentiating P with respect to R $$\frac{dP}{dR} = I^2 + 2RI\left(\frac{dI}{dR}\right).$$

to satisfy the requirements for autoregulation (dP/dR)>0.

Thus, $I^2 + 2RI$ (dI/dR)>0, which reduces to the above equation.

Once given the above disclosure, many other features, modifications and improvements will become apparent to the skilled artisan. Such other modifications, features and improvements are, therefore, considered a part of this invention, the scope of which is to be determined by the following claims.

I claim:

1. A temperature autoregulation heater comprising a layer of magnetic material,
  an electrical conductor means for inducing in said magnetic material layer an induced current constrained to follow a circuitous path through said magnetic layer to increase the resistive component of the input impedance of said electrical conductor below Curie temperature of said layer of magnetic material,
  said electrical conductor means including means for connecting said electrical conductor means to a source of high frequency, substantially constant conductor current,
  said induced current being substantially confined to said layer,
  said electrical conductor means and said layer of magnetic material being configured to produce a coupling approaching unity to cause said magnetic material when said conductor is connected to a high frequency, substantially, constant current source to be heated to a temperature at least approaching the Curie temperature thereby to reduce substantially its permeability and cause said resistive component of the input impedance to reduce substantially.

2. A heating device according to claim 1 wherein said sheet of magnetic material and said conductor are coaxial,
  further comprising a conductive member surrounded by said layer of magnetic material.

3. A heating device comprising:
  a current conductor having a plurality of serially connected substantially parallel turns sequentially spaced along a longitudinal axis,
  said current conductor having means for connecting it across a source of high frequency constant current,
  a sheet of high permeability magnetic material closely adjacent to an extended area of said turns,
  means for insulating said series of parallel turns from said sheet, and
  a source of high frequency alternating current for feeding a constant current through said conductor, to induce current in a confined region of said sheet thereby heating said sheet,
  said series of parallel turns and said sheet being arranged in such close proximity and the permeability of said sheet and the frequency of said alternating current being such that, the path of current induced in the sheet is substantially lengthened, and the impedance of the current path substantially increased,
  said sheet being heated to a sufficiently high temperature that its permeability substantially declines.

4. A temperature autoregulating heater according to claim 1 wherein said conductor is a multilayer winding,
  said layer of magnetic material and said conductor being coaxial,
  said winding being electrically insulated from said layer whereby said layer constitutes the secondary winding of a transformer with said conductor forming the primary winding thereof.

5. A temperature autoregulating heater according to claim 4 wherein
  said multilayer winding is disposed about said sheet,
  a hollow layer of magnetic material disposed about said multilayer winding, and
  a conductive shield disposed about said layer of magnetic material.

6. A temperature of autoregulating heater according to claim 5 wherein said magnetic sheet and layer are joined by a magnetic member at at least one end of each.

7. A temperature autoregulating heater according to claim 5 wherein said magnetic sheet and layer are joined by magnetic members at both ends of said magnetic sheet and layer.

8. A temperature autoregulating heater according to claims 3, or 2, or 4, or 5, or 6, or 7 further comprising
  a conductive rod about which said magnetic sheet is secured.

9. A temperature autoregulating heater according to claim 8 wherein said heater is a soldering iron including a soldering iron tip extending from said rod.

10. A temperature autoregulating heater according to claim 4 further comprising,
  means for connecting an alternating constant current across said winding and
  means for matching said heater to a source of current, said means comprising a capacitor approximately matching the inductance of said winding.

11. The device according to claim 3 wherein said electrical conductive means is a return conductor axially surrounded by and insulated from said sheet of magnetic material,
  said sheet and said conductor being electrically connected together at one end of each and having means for applying alternating constant current applied across opposite ends of each,
  said return conductor being circuitous in the region surrounded by said magnetic material.

12. The device according to claim 11 wherein said return conductor is helical.

13. The device according to claim 11 wherein said magnetic material is a sleeve surrounding said return conductor.

14. The device according to claim 12 or claim 13 further comprising
an impedance matching network having a parallel resonant circuit resonant at the operating frequency of the device,
said resonant circuit having a capacitor and an inductor,
said heating device being in series with said inductor.

15. The device according to claim 14 wherein said parallel resonant circuit has a Q of at least 4.5 and less.

16. The device according to claim 15 wherein said heater has a Q of approximately 1.5.

17. The device according to claim 16 wherein said inductor has a Q in the range 50–250.

18. The device according to claim 14 wherein said inductor as an iron dust inductor.

19. The device according to claim 13 wherein said magnetic material is laminated and electrically in contact with a further conductive material.

20. The device according to claim 19 wherein said laminated magnetic material and conductive material are coaxial with and insulated from the helix.

21. The device according to claim 20 wherein said conductive material is copper and said high mu material has a thickness equal to 0.5 to 1.8 skin depths of the high mu material at the frequency of alternating constant current source connected to said heating device.

22. A heating device according to claim 3 having a soldering iron tip heated by said sheet.

23. A soldering iron, comprising:
a current conductor having a plurality of serially connected substantially parallel turns sequentially spaced along a longitudinal axis,
a source of alternating current for feeding current through said conductor,
a sheet of high permeability magnetic material closely adjacent to an extended area of said turns,
means for insulating said conductor from said sheet,
said sheet being heated at least in part by induction to a temperature sufficiently high to cause the sheet's permeability to decline substantially,
a sheet of high electric and thermal conductivity in electrical and thermal contact with said magnetic sheet, and
a heat transferral tip heated by one of said sheets.

24. A soldering iron according to claim 23, wherein:
said magnetic sheet is substantially surrounded by said conductor turns.

25. A soldering iron according to claim 24, wherein:
said conductive sheet is substantially surrounded by said magnetic sheet.

26. A soldering iron, comprising:
a current conductor having a plurality of serially connected substantially parallel turns sequentially spaced along a longitudinal axis,
wherein said conductor is configured for connection across a source of high-frequecy alternating current,
a sheet of high permeability magnetic material closely adjacent to an extended area of said turns,
means of insulating said conductor from said sheet so that said sheet is heated by induction to a temperature sufficiently high to cause the sheet's permeability to decline substantially, and
a heat transferral tip heated by one of said sheets.

27. A soldering iron according to claim 26, further comprising:
a sheet of high conductivity in electrical and thermal contact with said magnetic sheet.

28. A soldering iron according to claim 26, further comprising:
a source of alternating electrical current for supplying said current conductor.

29. An article of manufacture constituting a heat generating cartridge comprising:
a current conductor having a plurality of serially connected substantially parallel turns sequentially spaced along a longitudinal axis,
wherein said conductor is configured for connection across a source of high-frequency alternating current,
a sheet of high permeability magnetic material closely adjacent to an extended area of said turns,
means for insulating said conductor from said sheet,
said sheet being heated at least in part by induction to a temperature sufficiently high to cause the permeability of the sheets to decline substantially, and
a heat transferral member in contact with and heated by one of said sheets.

30. An article of manufacture according to claim 29, further comprising:
a source of alternating substantially constant electrical current for supplying said current conductor.

31. An article of manufacture according to claim 29, further comprising;
a sheet of high electric and thermal conductivity in electrical and thermal contact with said magnetic sheet.

32. A soldering iron according to claim 25, further comprising:
a second magnetic sheet substantially surrounding said conductor turns.

33. A soldering iron according to claim 32, wherein:
said second magnetic sheet is in electrical contact with said first magnetic sheet.

34. A soldering iron according to claim 32 or claim 33,
wherein the Curie temperature of said second magnetic sheet is higher than the Curie temperature of said first magnetic sheet.

35. A soldering iron according to claim 34 wherein the Curie temperature of said second magnetic sheet is sufficiently high that the temperature of the soldering iron does not approach such temperature sufficiently closely to materially reduce the permeability thereof.

36. A tip construction for a heating device comprising,
a tip of thermally and electricity conductive material,
a rearward extension of said material of said tip,
a layer of magnetic material disposed about in physical, thermal and electrical contact with said rearward extension,
a coil of electrically conductive wire disposed about and in close relation to said layer whereby to induce eddy currents in said layer, and
said close relation substantially increasing the impedance of said coil,
means adapted to connect said coil to a source of alternating current whereby to heat said layer to a temperature sufficiently high to cause the permeability of said layer to decrease materially.

37. The method of utilizing a soldering iron element to melt solder comprising:
providing a source of radio frequency current, passing radio frequency current from said source along a generally helical path adjacent to said element to induce current therein and heat the element, distorting the path of the current in said element to elongate said path in said element and thereby increase the length of the path of the current in said element whereby to increase the impedance of said helical path to said radio frequency current, and substantially matching the impedance of said source to said helical path, whereby the increased impedance of said helical path facilitates said substantial matching.

38. The method of claim 37 in which said element includes ferromagnetic material heated by said current in said element to a sufficiently high temperature as to effect a decline in the permeability of said ferromagnetic material.

39. A temperature autoregulating heater according to claim 1 wherein the ratio of the width of each turn of said winding to the spacing between said turns of the winding and said layer of magnetic material is at least 4:1.

* * * * *

UNITED STATES PATENT AND TRADEMARK OFFICE
CERTIFICATE OF CORRECTION

PATENT NO. : 4,745,264
DATED : May 17, 1988
INVENTOR(S) : Carter

It is certified that error appears in the above-identified patent and that said Letters Patent are hereby corrected as shown below:

On the cover page, under "Related U.S. Application Data" at [63], the date should be --1984.--

Signed and Sealed this

Twentieth Day of December, 1988

*Attest:*

DONALD J. QUIGG

*Attesting Officer*     *Commissioner of Patents and Trademarks*